(12) United States Patent
Aoki et al.

(10) Patent No.: US 11,534,797 B2
(45) Date of Patent: Dec. 27, 2022

(54) LINEAR OBJECT REMOVAL METHOD, LINEAR OBJECT REMOVAL DEVICE, AND ELECTRONIC/ELECTRIC APPARATUS COMPONENT SCRAP PROCESSING METHOD

(71) Applicant: JX NIPPON MINING & METALS CORPORATION, Tokyo (JP)

(72) Inventors: Katsushi Aoki, Hitachi (JP); Tsubasa Takeda, Hitachi (JP)

(73) Assignee: JX NIPPON MINING & METALS CORPORATION, Tokyo (JP)

( * ) Notice: Subject to any disclaimer, the term of this patent is extended or adjusted under 35 U.S.C. 154(b) by 0 days.

(21) Appl. No.: 17/272,913

(22) PCT Filed: Sep. 3, 2019

(86) PCT No.: PCT/JP2019/034638
§ 371 (c)(1),
(2) Date: Mar. 2, 2021

(87) PCT Pub. No.: WO2020/050274
PCT Pub. Date: Mar. 12, 2020

(65) Prior Publication Data
US 2021/0197229 A1 Jul. 1, 2021

(30) Foreign Application Priority Data
Sep. 3, 2018 (JP) .............................. JP2018-164791

(51) Int. Cl.
*B07B 1/12* (2006.01)
*B07B 1/36* (2006.01)
*B09B 3/00* (2022.01)

(52) U.S. Cl.
CPC ................. *B07B 1/12* (2013.01); *B07B 1/36* (2013.01); *B09B 3/00* (2013.01)

(58) Field of Classification Search
CPC ................. B07B 1/12; B07B 1/36; B09B 3/00
(Continued)

(56) References Cited

U.S. PATENT DOCUMENTS 2,529,620 A * 11/1950 Marnach ................... A23N 5/00
99/628
4,119,453 A * 10/1978 Knezevich ............ B07B 13/003
241/73

(Continued)

FOREIGN PATENT DOCUMENTS

CA        730519 A     3/1966
CN      2611055 Y     4/2004
(Continued)

OTHER PUBLICATIONS

English Translation of JP 2001205193 A; Inventor: Fumio Takeda; Pub. Date: Jul. 2001 (Year: 2001).*

(Continued)

*Primary Examiner* — Joseph C Rodriguez
(74) *Attorney, Agent, or Firm* — Birch, Stewart, Kolasch & Birch, LLP

(57) ABSTRACT

Provided is a method for removing wire-form objects, a device for removing wire-form objects, and a method for processing electronic/electrical apparatus component waste, which can efficiently sort wire-form objects from sorting target objects having various shapes. The method for removing wire-form objects includes: arranging a plurality of filters 3 in a vibrating sieve machine 1 such that the filters 3 are adjacent to each other so as to partially overlap with each other in a feed direction of a raw material, each of the filters including a plurality of rods 2 extending at distances in the feed direction and a beam portion 21 for supporting the plurality of rods 2 at one ends 2a of the plurality of rods 2, the other ends 2b of the plurality of rods 2 being free ends; and feeding a raw material containing at least wire-form (Continued)

objects and plate-form objects into the vibrating sieve machine 1; and vibrating the filters 3 to sieve out the wire-form objects toward an under-sieve side of the vibrating sieve machine 1.

18 Claims, 8 Drawing Sheets

(58) Field of Classification Search
USPC .......................................................... 209/262
See application file for complete search history.

(56) References Cited

U.S. PATENT DOCUMENTS

| | | | |
|---|---|---|---|
| 5,219,078 A | | 6/1993 | Hadden |
| 5,769,240 A | * | 6/1998 | Middour ............... B07B 1/4672 |
| | | | 209/412 |
| 7,383,957 B2 | * | 6/2008 | Cox ........................ B07B 1/12 |
| | | | 209/395 |
| 2006/0289686 A1 | | 12/2006 | Cox |
| 2021/0039138 A1 | | 2/2021 | Aoki et al. |

FOREIGN PATENT DOCUMENTS

| | | | |
|---|---|---|---|
| CN | 102500600 A | | 6/2012 |
| CN | 103586206 A | | 2/2014 |
| EP | 0 492 259 A1 | | 7/1992 |
| GB | 2 247 850 A | | 3/1992 |
| JP | 55-58271 U | | 4/1980 |
| JP | 64-90074 A | | 4/1989 |
| JP | 10314675 A | * | 12/1998 |
| JP | 2001-205193 A | | 7/2001 |
| JP | 2002-301434 A | | 10/2002 |
| JP | 2006-780 A | | 1/2006 |
| JP | 2008-6423 A | | 1/2008 |
| JP | 2009-142765 A | | 7/2009 |
| JP | 2010-51888 A | | 3/2010 |
| JP | 2015-123418 A | | 7/2015 |
| JP | 2015-150505 A | | 8/2015 |
| JP | 2017-170388 A | | 9/2017 |
| WO | WO 94/09089 A1 | | 4/1994 |
| WO | WO 2019/151350 A1 | | 8/2019 |

OTHER PUBLICATIONS

International Search Report for PCT/JP2019/034638 (PCT/ISA/210) dated Nov. 26, 2019.
Written Opinion of the International Searching Authority for PCT/JP2019/034638 (PCT/ISA/237) dated Nov. 26, 2019.
International Preliminary Report on Patentability and English translation of the Written Opinion of the International Searching Authority (forms PCT/IB/373, PCT/ISA/237 and PCT/IB/338), dated Mar. 18, 2021, for corresponding International Application No. PCT/JP2019/034638.
Japanese Office Action for corresponding Japanese Application No. 2018-164791, dated Oct. 5, 2021, with an English translation.
Extended European Search Report for corresponding European Application No. 19857293.5, dated Apr. 19, 2022.
Chinese Office Action and Search Report for corresponding Chinese Application No. 201980057304.2, dated May 7, 2022, with an English translation.

* cited by examiner

LINEAR OBJECT REMOVAL METHOD, LINEAR OBJECT REMOVAL DEVICE, AND ELECTRONIC/ELECTRIC APPARATUS COMPONENT SCRAP PROCESSING METHOD

FIELD OF THE INVENTION

The present invention relates to a method for removing wire-form objects, a device for removing wire-form objects, and a method for processing electronic/electrical apparatus component scrap. More particularly, it relates to a method for removing wire-form objects, a device for removing wire-form objects, and a method for processing electronic/electrical apparatus component waste, which are suitable for recycling of used electronic/electrical apparatuses.

BACKGROUND OF THE INVENTION

There is known a device for selectively removing particular foreign matters, for example, wire-form objects, from objects to be sorted. For example, Japanese Patent Application Publication No. 2015-150505 A (Patent Literature 1) describes an example of a sorting device for sorting a target sorting object from a mixture of long materials by sorting with a vibrating screen and sorting with an air stream.

Further, from the viewpoint of resource conservation in recent years, recovery of variable metals from electronic/electrical apparatus component scrap such as waste electronic home appliances, PCs and mobile phones has increasingly become popular, and an efficient method for recovering the valuable metals has been studied. For example, Japanese Patent Application Publication No. 2015-123418 A (Patent Literature 2) discloses that electronic/electrical apparatus component scrap containing copper is incinerated and then crushed to a predetermined size or less, and the crushed electronic/electrical apparatus component scrap is processed in a copper blast furnace.

CITATION LIST

Patent Literatures

[Patent Literature 1] Japanese Patent Application Publication No. 2015-150505 A
[Patent Literature 2] Japanese Patent Application Publication No. 2015-123418 A

SUMMARY OF THE INVENTION

However, as illustrated in FIGS. 8(a) and 8(b), Patent Literature 1 only discloses a sorting device for sorting long wire-form and long scattering target objects, and the method disclosed in the literature does not use any sorting target objects containing foreign matters having shapes other than the long wire-form objects, such as plate, pillar and cylindrical shapes, as sorting target objects.

As described in Patent Literature 2, when the incinerated electronic/electrical apparatus component scrap is processed in the blast furnace, the presence of refining inhibitors such as aluminum, antimony, iron and nickel in the electronic/electrical apparatus component scrap may decrease a processing efficiency of the blast furnace for processing the scrap. In order to suppress the introduction of the refining inhibitors into the blast furnace, it is desirable to carry out processing for previously reducing the refining inhibitors in the electronic/electrical apparatus component scrap to be introduced into the blast furnace.

Further, in recent years, separation of single components from the electronic/electrical apparatus component scrap and processing of them have also been considered. However, under the circumstances, it is difficult to selectively separate and recover desired single components from a wide variety of component scrap having various shapes, and various studies have been made.

In particular, the electronic/electrical apparatus component scrap contains linear objects such as covered wires, copper wires, and bird's nests (hereinafter referred to as "wire-form objects" or "wire-form scrap"). The wire-form objects are easily entangled with other components and/or equipment when sorting desired single components from a wide variety of component scrap having various shapes, which may cause deterioration of separation accuracy and equipment troubles. Further, coated portions of the coated wires contain Sb which is the refining inhibitor, and the coated wires may be mixed into the blast furnace to affect the operation of the blast furnace.

In view of the above problems, the present disclosure provides a method for removing wire-form objects, a device for removing wire-form objects, and a method for processing electronic/electrical apparatus component waste, which can efficiently sort wire-form objects from sorting target objects having various shapes.

As a result of intensive studies in order to solve the above problems, the present inventors have found that the wire-form objects can be efficiently removed from sorting target objects by improving the shape of filters arranged in a vibrating sieve machine.

In one aspect, the method for removing wire-form objects according to an embodiment of the present invention completed on the basis of the above findings is a method for removing wire-form objects, the method comprising: arranging a plurality of filters in a vibrating sieve machine such that the filters are adjacent to each other so as to partially overlap with each other in a feed direction of a raw material, each of the filters comprising a plurality of rods extending at distances in the feed direction and a beam portion for supporting the plurality of rods at one ends of the plurality of rods, the other ends of the plurality of rods being free ends; and feeding a raw material containing at least wire-form objects and plate-form objects into the vibrating sieve machine; and vibrating the filters to sieve out the wire-form objects toward an under-sieve side of the vibrating sieve machine.

In one aspect, the method for processing electronic/electrical apparatus component scrap according to an embodiment of the present invention is a method for processing electronic/electrical apparatus component scrap, the method comprising: arranging a plurality of filters in a vibrating sieve machine such that the filters are adjacent to each other so as to partially overlap with each other in a feed direction of a raw material, each of the filters comprising a plurality of rods extending at distances in the feed direction and a beam portion for supporting the plurality of rods at one ends of the plurality of rods, the other ends of the plurality of rods being free ends; and feeding a raw material containing at least substrate scrap and wire scrap into the vibrating sieve machine, and vibrating the filters to sieve out wire-form objects toward an under-sieve side of the vibrating sieve machine.

In one aspect, the device for removing wire-form objects according to an embodiment of the present invention is a device for removing wire-form objects, the device comprising: a vibrating sieve machine; a plurality of filters arranged in the vibrating sieve machine such that the filters are adjacent to each other so as to partially overlap with each other in a feed direction of a raw material, each of the filters comprising a plurality of rods extending at distances in the feed direction and a beam portion for supporting the plurality of rods at one ends of the plurality of rods, the other ends of the plurality of rods being free ends; and a vibrator for vibrating the filters to sieve out wire-form objects from a raw material containing at least the wire-form objects and plate-form objects toward an under-sieve side of the vibrating sieve machine.

According to the present disclosure, it is possible to provide a method for removing wire-form objects, a device for removing wire-form objects, and a method for processing electronic/electrical apparatus component waste, which can efficiently sort wire-form objects from sorting target objects having various shapes.

BRIEF DESCRIPTION OF THE DRAWINGS

FIG. 7 (b) is a schematic view showing a positional relationship of a pressing member, and a sorted state of plate-form objects and wire-form objects, as viewed from an extending direction of a rod in a device for removing wire-form objects.

DETAILED DESCRIPTION OF THE INVENTION

Hereinafter, embodiments of the present invention will be described with reference to the drawings. The embodiments as shown below illustrate devices and methods for embodying the technical idea of the present invention, and the technical idea of the present invention does not limit structures, arrangement, and the like of components to those described below.

Figure 1:
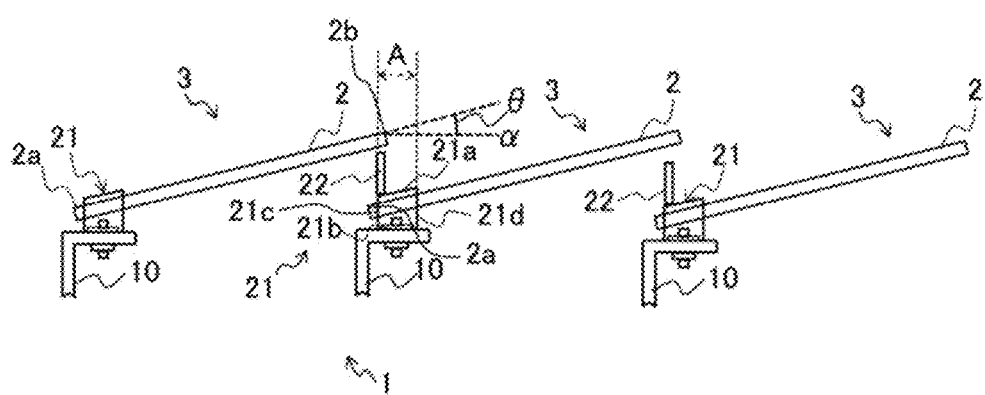
FIG. 1 is a partial side view showing an example of a device for removing wire-form objects according to an embodiment of the present invention.

As shown in FIG. 1, a device for removing wire-form objects according to an embodiment of the present invention includes a plurality of filters 3 which are fixed to fixing portions 10 arranged in a vibrating sieve machine 1 (a vibrating sieve machine body), and which are arranged adjacent to each other in a feeding direction of a raw material. The plurality of filters 3 are vibrated by a vibrator (not shown), so that the raw material fed onto the filters 3 are sieved.

The raw material used in the method for removing wire-form objects according to the embodiment of the present invention is not particularly limited as long as it is a raw material containing at least wire-form objects and plate-form objects. The wire-form objects mean wire-shaped members each having a short diameter and a long diameter, and may include various wires such as electric wires, cables, and conducting wires, although not particularly limited thereto. The plate-form objects are not particularly limited as long as they are plate-shaped members, and examples of them include substrates, plastic plates, metal plates and the like. Typically, for example, a plate-shaped member having a surface area of 1 $cm^2$ or more and a thickness of 2 mm or more can be suitably used.

The raw material may contain objects each having a three-dimensional shape other than the wire-form and plate-form, for example, a cylindrical shape, a pillar shape, a rectangular shape, an irregular block shape, and the like. In the following descriptions, a case where electronic/electrical apparatus component scrap is used as the raw material will be described as an example. However, as described above, the raw material used in the embodiments of the present invention is not, of course, limited to the electronic/electrical apparatus component scrap.

Also, as used herein, the "electronic/electrical apparatus component scrap" refers to scrap obtained by crushing electronic/electric apparatuses such as waste home electric appliances, PCs, and mobile phones, recovering them and then crushing them to an appropriate size. In the present invention, the crushing for obtaining the electronic/electrical apparatus component scrap may be performed by an operator. However, crushed objects may be purchased on the market. The crushing means is carried out by any apparatus that is not limited to a specific apparatus. The apparatus does not include that belongs to the category of a crusher, and it is desirable to carry out crushing so that the shape of the component is not impaired as much as possible.

In the present embodiment, the electronic/electrical apparatus component scrap is preferably crushed to a maximum diameter of about 100 mm or less, although not limited thereto. Further, it is preferable that the raw material of the electronic/electrical apparatus component scrap according to the present embodiment is coarsely crushed in advance to separate the scrap as single components in the form of capacitors, plastics, substrates, wire scrap, ICs, connectors, metals and the like. This can lead to easy sorting of specific single components by a rotary sorting machine as described later.

The coarsely crushed electronic/electrical apparatus component scrap may be subjected to wind power sorting, and lightweight products sorted in the wind power sorting of 3 to 20 m/s may be used as the processing target of the present embodiment. By combining the wind power sorting, a sorting efficiency can be improved. The wind power sorting may be performed before or after sieving of the wire-form scrap as described below. The separation of noble metal-containing materials such as substrates and ICs from metals is preferably carried out at a wind rate of from 10 to 18 m/s, more preferably from 15 to 18 m/s, although it depends on the materials contained in the electronic/electrical apparatus component scrap. In order to improve the concentration of the condenser and the metal fraction, the optimum wind rate is preferably from 5 to 15 m/s, and more preferably from 8 to 12 m/s.

When separating plastics from component scrap containing films, powders, plastics, and the like, which may affect clogging of the filters or an erroneous detection of a sensor in the subsequent sorting process, the wind rate is preferably from 5 to 8 m/s, and more preferably from 6 to 7 m/s.

In the present embodiment, wire scrap is separated from the raw material, i.e., the electronic/electrical apparatus component scrap herein, as wire-form objects contained in the electronic/electrical apparatus component scrap, by sieving with, for example, a vibrating sieve machine 1 as shown in FIG. 1. The "wire scrap" means inter-device wirings of electronic/electric apparatuses and electric wires used inside the apparatuses, which are made of copper, copper alloys, aluminum and the like. The wire scrap includes long linear scrap called coated wires, copper wires, or bird's nests.

The wire scrap is easily entangled with other components and equipment when sorting the electronic/electric apparatus component scrap, which may cause deterioration of separation accuracy and equipment troubles. Among the wire scrap, the coated wires particularly contain about 0.3% of Sb which is a refining inhibitor, in the coated portion. The mixing of the coated wires into the blast furnace may affect the operation of the blast furnace.

In the present embodiment, when sieving the wire scrap from the electronic/electrical apparatus component scrap using the vibrating sieve machine 1, the coated wires can be separated by sieving to remove Sb, the refining inhibitor, to the outside of the processing system of the blast furnace.

Figure 2:
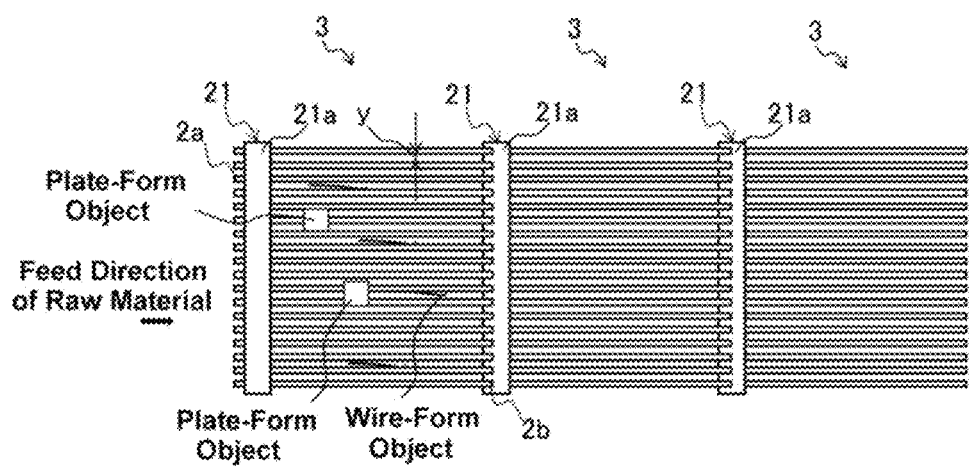
FIG. 2 is a partial top view showing an example of a device for removing wire-form objects according to an embodiment of the present invention.

The vibrating sieve machine 1 may employ a generally available machine, and its detailed structure is not particularly limited. However, when sieving the wire-form objects, the shape of each filter 3 is particularly devised. Specifically, as shown in FIG. 1 or FIG. 2, the filters 3 each having a plurality of rods 2 each extending at distances y from each other in the feeding direction of the raw material (in the left-right direction in the figure) and beam portions 21 for supporting the plurality of rods at one ends 2a of the plurality of rods 2, the other ends 2b of the plurality of rods 2 being free ends, are arranged in the vibrating sieve machine 1. By arranging the plurality of filters 3 in which the other ends 2b of the plurality of rods 2 are free ends side by side, a decrease in a sorting efficiency due to catching of wire-form objects can be more effectively suppressed. As shown in FIG. 1, the plurality of filters 3 are arranged adjacent to each other so as to partially overlap with each other in the feed direction.

As shown in FIG. 2, the plurality of rods 2 extend in a direction substantially parallel to the feed direction of the raw material, and extend at distances y so as to be parallel to each other. As shown in FIG. 1, each of the filters 3 is arranged so as to be inclined such that the height on the downstream side in the feed direction of the raw material is higher than that on the upstream side in the feed direction of the raw material. When these filters 3 are horizontally arranged, the full length of the filters 3 becomes longer, resulting in a larger device. On the other hand, by arranging the plurality of filters 3 so as to be inclined as shown in FIG. 1, a conveying distance required for improving the sorting efficiency of the wire-form objects can be ensured, so that the sorting efficiency of the wire-form objects from the plate-form objects can be further improved.

On the other hand, if an inclination angle of each filter 3 is too large, the raw material may hit an upper motor (not shown) above the vibrating sieve machine 1, or the raw material may protrude from the vibrating sieve machine 1 to cause the raw material to fall out. Therefore, it is preferable to arrange each of the plurality of filters 3 such that an inclination angle θ of each of the plurality of filters 3 with respect to a horizontal plane is larger than 0° and 45° or less, and more preferably the inclination angle θ is larger than 0° and 30° or less, and even more preferably the inclination angle θ is larger than 0° and 15° or less.

As shown in FIG. 1, the inclination angle θ of each of the plurality of filters 3 with respect to the horizontal plane means an angle formed by a horizontal plane a and an upper surface serving as the conveying surface of each of the plurality of filters 3. All the inclination angles θ of the filters 3 may not be inclined to the same angle, the inclination angles may be changed to appropriate angles depending on arrangement positions of the filters 3. For example, the inclination angle can be gradually decreased or increased in the feed direction.

Figure 3:
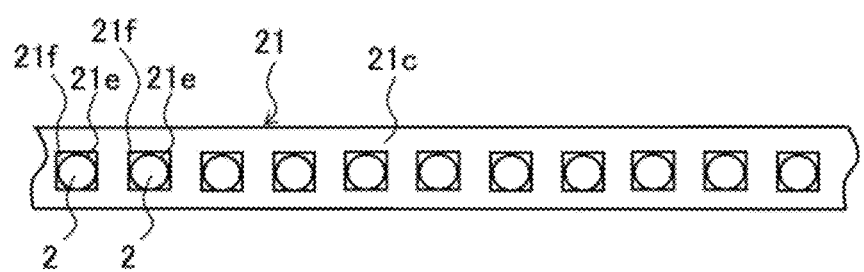
FIG. 3 is a partial side view showing an example of a welded state between a beam portion and a plurality of rods.

The beam portions 21 arranged at one ends 2a of the plurality of rods 2 included in the filters 3 can utilize metal prism blocks each having a hollow or solid central portion. Each beam portion 21 is made of a hollow or solid metal member composed of an upper surface portion 21a extending in a direction intersecting with an extending direction of the plurality of rods 2 on the plurality of rods 2, a lower surface portion 21b opposing to the upper surface portion 21a, and two side surface portions 21c, 21d intersecting with the upper surface portion 21a and the lower surface portion 21b. As shown in FIG. 3, the two side surface portions 21c, 21d are provided with a plurality of holes 21e, into which the plurality of rods 2 are inserted and fixed by welded portions 21f.

By fixing the plurality of rods 2 through the holes 21e and the welded portion 21f such that the plurality of rods 2 penetrate the beam portion 21, the fixing between the plurality of rods 2 and the beam portions 21 is strengthened. This can allow materials having a relatively large specific gravity such as electronic/electrical apparatus component scrap to be stably sorted, even if the filters 3 have a cantilever shape in which the beam portions 21 at one ends 2a of the plurality of rods 2 and the other ends 2b are the free ends.

When the filters 3 are arranged adjacent to each other in the feed direction of the raw material, they are preferably arranged such that the upper surface portion 21a of the beam portion 21 possessed by one filter 3 is arranged immediately below the free end that is the other end 2b of the plurality of rods 2 possessed by the other filter 3 adjacent to the one filter 3 on the upstream side in the feed direction of the raw material.

In the arrangement of the filters 3 as shown in FIG. 1, the plate-form objects such as substrate scrap may stand up at a boundary portion between one filter 3 and the other filter 3 during the conveying of the raw material from one filter 3 to the other filter 3, which may cause a phenomenon that the plate-form objects fall out to the under-side of the sieve. However, the filters 3 are arranged such that one filter 3 overlaps with the upper surface portion 21a of the other filter 3 directly below the one filter 3 on the free end side of the other ends 2b of the plurality of rods 2, whereby the phenomenon that the plate-form objects accidentally fall out to the under-side of the sieve at the boundary portion between the filters 3.

Further, when the raw material is conveyed from one filter 3 to the other filter 3, the raw material can be once dropped onto the upper surface portion 21a without directly falling onto the plurality of rods 2. Therefore, any damage of the plurality of rods 2 can be suppressed, so that the sorting device can be operated for a longer period of time without requiring replacement of parts.

Further, as shown in FIG. 1, upon one end 2a of the beam portion 21 is a fall prevention tool 22 that extends in a direction intersecting with the extending direction of the plurality of rods 2, and extends in a substantially vertical direction from one end 2a of the beam portion 21 toward an upper direction. The fall prevention tool 22 can be arranged in a space between the other end 2b of the rod 2 and one end 2a of the other rod 2 arranged below the other end 2b of the rod 2. The fall prevention tool 22 prevents the raw material that should fall from the other end 2b of the rod 2 to the upper surface portion 21a of the beam portion 21 from accidentally falling to the under-side of the sieve. In particular, when the distance between one end 2a and the other end 2b of the rod 2 becomes longer, the fall prevention tool 22 can be provided to prevent the raw material that should not be separated to the under-sieve side from falling to the under-sieve side. It should be noted that FIG. 1 illustrates an example of the fall prevention tool 22 extending in the substantially vertical direction from the upper surface portion 21a of the beam portion 21, but, of course, the fall prevention tool 22 may be slightly inclined toward the upstream side or the downstream side in the feed direction.

Figure 4:
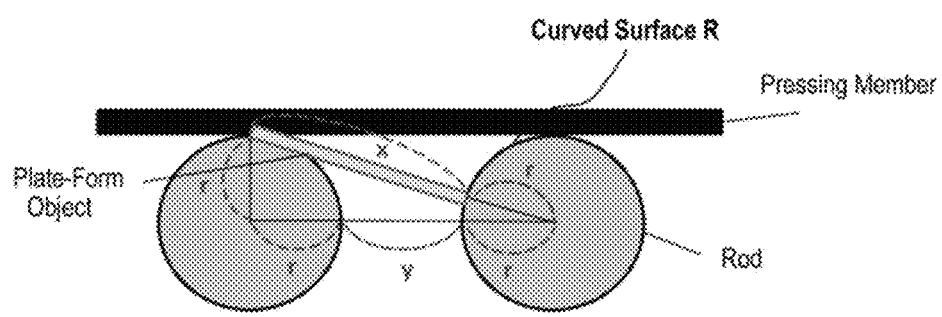
FIG. 4 is a schematic view showing a relationship between a distance and radii of a plurality of rods.

As shown in FIG. 4, a surface of each of the plurality of rods 2 has a curved surface R formed for sieving out the wire scrap under the sieve. Since the wire scrap has a linear shape, if the surface of each of the rods 2 is angular, the wire scrap may be caught by the rods 2 when the wire scrap moves along the feeding direction of the raw material to rise, whereby the wire crap may not be properly separated toward the under-side of the sieve.

The curved surface R formed on the surface of each of the plurality of rods 2 can allow smoother contact of the wire scrap with the rods 2, so that the sorting efficiency of the wire scrap can be further improved. In addition, the surface of each of the plurality of rods 2 may be subjected to surface processing for allowing smooth contact with the wire scrap.

Here, it is preferable that a distance between the rods 2 and a diameter of each rod 2 are adjusted based on the size of substrates X contained in the electronic/electrical apparatus component scrap. More particularly, for example, as shown in FIG. 4, a distance y between the rods 2 and a radius r of each rod 2 are adjusted so as to have a relationship of $r^2+(y+2r)^2=(x+r)^2$, in which x (mm) is an average size (diameter) of the substrate X contained in the electronic/electrical apparatus component scrap fed on the filter 3, y is a distance between the rods, and r is a radius of each of the rods.

For example, it is preferable that the distance between the plurality of rods 2 is adjusted such that it is 1.2 to 6 times a characteristic particle diameter of the wire-form objects and is narrower than the minimum short dimeter of the plate-form objects. As used herein, the "characteristic particle diameter" of the wire-form objects is determined by extracting arbitrary ten points of the wire-form objects in the raw material, calculating an average diameter of the extracted ten points of the wire-form objects on the long diameter side, repeating them 5 times, and calculating an average value thereof to obtain the "characteristic particle diameter". Similarly, the minimum short diameter of the plate-form objects means an average value obtained by extracting arbitrary ten points of the plate-form objects in the raw material, calculating an average diameter of the extracted ten points of the plate-form objects on the short particle size side, and repeating them 5 times.

More particularly, the rod diameter (2r) can be from 1 to 15 mm, for example, although not limited thereto. The distance between the rods can be from 1 to 10 mm, and more preferably from 1.5 to 5 mm. The length of each rod 2 is preferably 2 to 30 times the characteristic particle diameter of the wire-form objects. More particularly, the length of each rod 2 is from 100 to 600 mm, and more preferably from 200 to 400 mm.

Figure 6:
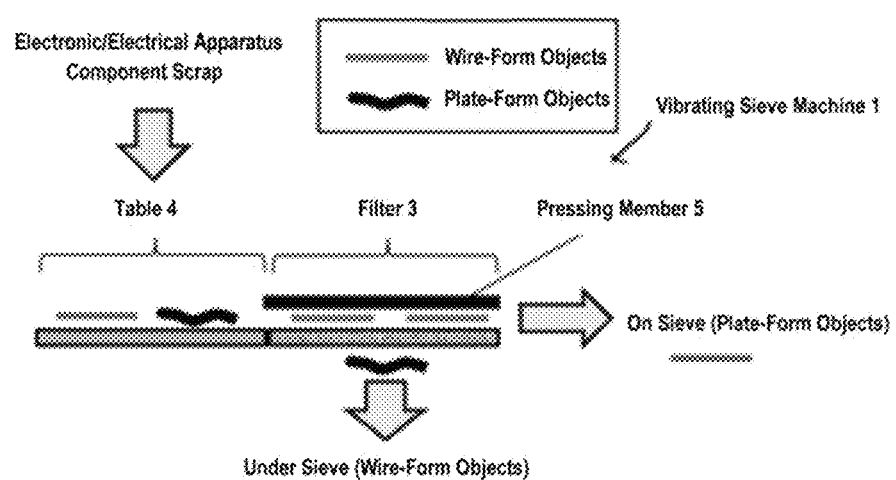
FIG. 6 is a schematic view showing an example of a filter having a beam portion at both ends of a rod.

As shown in FIG. 6, a table 4 can be arranged on a further upstream side of each filter 3. The electronic/electrical apparatus component scrap is arranged on the filter 3 from the table 4, and vibrated by a vibrator (not shown) on the filter 3, thereby sorting precious metal-containing objects comprised of the plate-form objects such as substrates and ICs on the sieve and sorting the wire-form objects under the sieve.

The table 4 is formed of a board having a flat plate shape, which does not substantially have a gap for sieving out the wire scrap, and the raw material is first fed onto the table 4 before being fed to the filter 3. First, by vibrating the raw material fed on the table 4, the raw material can be dispersed on the upper surface of the table 4. Then, by feeding the dispersed raw material from the upper surface of the table to an upper surface of the filter, an efficiency of sorting the wire-form objects from the plate-form objects through the filters 3 can be further increased. Further, once vibration is applied to the raw material on the table 4, it also provides an effect that orientations of the wire-form objects can be aligned. The vibration applied to the table 4 may be substantially the same as the vibration applied to the filters 3.

Figure 7:
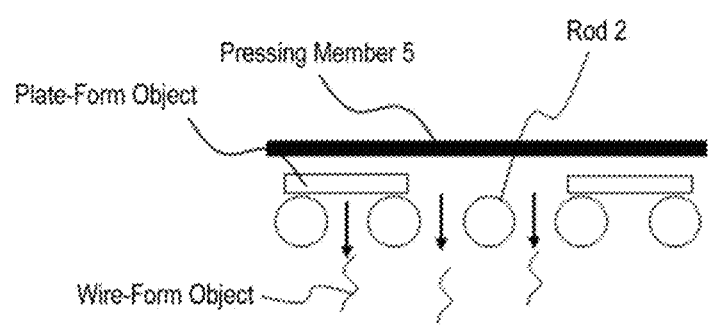
FIG. 7 (a) is a schematic view showing a positional relationship of a pressing member, and a sorted state of plate-form objects and wire-form objects, as viewed from a feed direction of a raw material in a device for removing wire-form objects.
Figure 7:
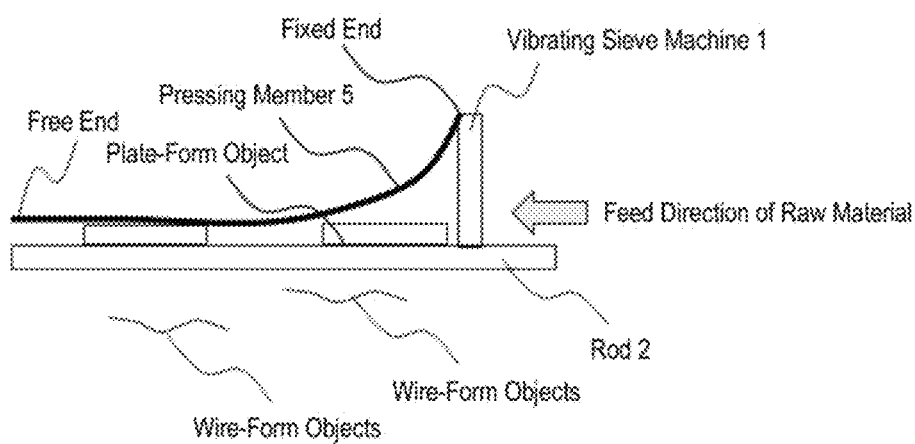

In the present embodiment, it is more preferable that the sieving is performed while arranging a pressing member 5 for pressing the raw material on the raw material placed on the filters 3, as shown in FIG. 7 (*a*). The pressing member 5 may have such a material and shape that can prevent the plate-form objects contained in the raw material from being rotated due to the vibration applied to the filters 3 and prevent the plate-form objects from falling out from the distances between the rods 2.

Examples of the pressing member 5 that can be used include elastic members such as rubber members, resin members and sponge members, which have elasticity and can maintain the raw material by the elastic force. An elastic vinyl sheet and the like can also be used as the pressing member 5. The use of the elastic member as the pressing member 5 can allow it to move together with the raw material while maintaining a constant distance from the vibrating filter 3, so that unnecessary rotation of the plate-form objects in the raw material can be suppressed. The pressing member 5 may be a member having one or more holes so as to have appropriate frictional force with the raw material.

A plurality of pressing members 5 may be laminated upon the raw material fed onto the filters 3. However, excessive lamination may make it difficult to adjust the load for objects having larger variations in the shapes and sizes of the components contained in the raw material. It is possible to apply the load such that the pressing member 5 is pressed from the upper side of the raw material. However, an excessive load may lead to clogging of the space between the pressing member 5 and the filter 3 with the plate-form objects such as substrates.

The thickness of the pressing member 5 can be selected as needed, depending on the raw material used. When using, for example, the rubber member as the pressing member 5, a sheet-shaped member having a thickness of about 2 to 20 mm is preferably arranged so as to cover the raw material. The covering of the raw material with the pressing member 5 can allow an appropriate load to be applied onto the electronic/electrical apparatus components, thereby improving the sorting efficiency. A weight such as an iron plate may be placed on the pressing member 5 to adjust the load.

As shown in FIG. 7 (b), one end of the pressing member 5 on the feed side of the raw material has a fixed end that is fixed to the vibrating sieve machine 1, and the other end of the pressing member 5 on the discharge side of the raw material has a free end that is not fixed to the vibrating sieve machine 1. The fixed one end of the pressing member 5 can prevent the pressing member from flowing toward the discharge side of the raw material together with the raw material, and the free other end of the pressing member 5 can allow the other end of the pressing member 5 to become easier to move according to the shape and vibration of the raw material, so that the pressing member 5 can facilitate more appropriate pressing of the raw material.

As shown in FIG. 7 (b), the fixed end of the pressing member 5 is fixed to an upper portion (upper end) on a feed port side of the vibrating sieve machine 1 for feeding the raw material onto the filter 3. Starting from the fixed end, the pressing member 5 is configured to be suspended from the feed side toward the discharge side of the raw material, and the free end of the pressing member 5 is movable in an up-down direction while pressing the raw material on the filter 3 on the discharge side of the raw material. With such a configuration, on the feed side of the raw material, the raw material can be easily vibrated to easily align the orientations of the wire-form objects, and on the discharge side of the raw material, the wire-form objects can be easily sieved toward the under-side of the filters 3 by pressing the movement in the up-down direction due to the vibration of the raw material with the pressing member 5.

The pressing member 5 can be arranged in a such size that covers the entire surface of the filter 3. This can allow unnecessary rotation of all of the raw materials on the filters 3 to be pressed with the single pressing member 5, thereby suppressing the falling out of the plate-form objects from the spaces between the rods 2. Alternatively, a plurality of pressing members 5 may be arranged from the feed direction of the raw material to the discharge direction of the raw material.

It should be noted that the pressing member 5 may be arranged on each of the plurality of filters 3, or may be arranged only on the filter 3 on the most upstream side when viewed from the feed side of the raw material.

The sieving of the raw material using the vibrating sieve machine 1 is preferably repeated twice or more. For example, when the electronic/electrical apparatus components are used as the raw material, substrates with components and substrates with no component in the electronic/electrical apparatus components are separated by a first-stage sieving. Then, the second-stage sieving can be further carried out for the substrates with no component to transfer approximately 40% of substrates of the entire electronic/electrical apparatus component onto the sieve.

Further, in addition to the two-step sieving, the load adjustment on the electronic/electrical apparatus components can be carried out with the pressing member 5 to transfer about 70% of substrates contained in the electronic/electrical apparatus components onto the sieve at the end of the second-stage sieving, and transfer about 90% of the wire scrap (coated wires) under the sieve.

The vibration is applied to the filter 3 at any magnitude which is not particularly limited as long as the orientations of the wire-form objects can be aligned. The vibration direction is preferably the same as the extending direction of the rod 2, that is, the direction parallel to the feed direction of the raw material (front-back direction). When carrying out continuous processing, the vibration is preferably applied in the up-down direction in addition to the front-back direction. Any amplitude may be employed as long as the raw material moves forward, and can be set as needed depending on to the throughput of the raw material. A device for supplying the vibration applied to the filter 3 may be of a linear type or a rotary type, and is not particularly limited as long as it can generate predetermined vibration.

For example, the vibration can be applied to the upper surfaces of the filters 3 so that each of a vibration width in a perpendicular direction (a vibration width in the up-down direction) and a vibration width in the front-back direction is from 0.5 to 10 mm. If the vibration width is too high, the separation efficiency of the wire scrap may decrease, and if the vibration width is too low, the effect of vibration cannot be significantly obtained. Therefore, the vibration width may more preferably be from 5 to 8 mm. Alternatively, the filters 3 are vibrated at a frequency of about 50 Hz, and the magnitude of the vibration can be adjusted such that transmissibility (excitation ratio) of vibration transmitted from the vibration source to the filters 3 is between 10 to 90%.

The vibration can be intermittently or continuously applied to the filters 3. By continuously applying the vibration, a recovery process of the wire strap can be stably carried out, and by intermittently applying the vibration, the power required for driving the vibration can be omitted.

Figure 5:
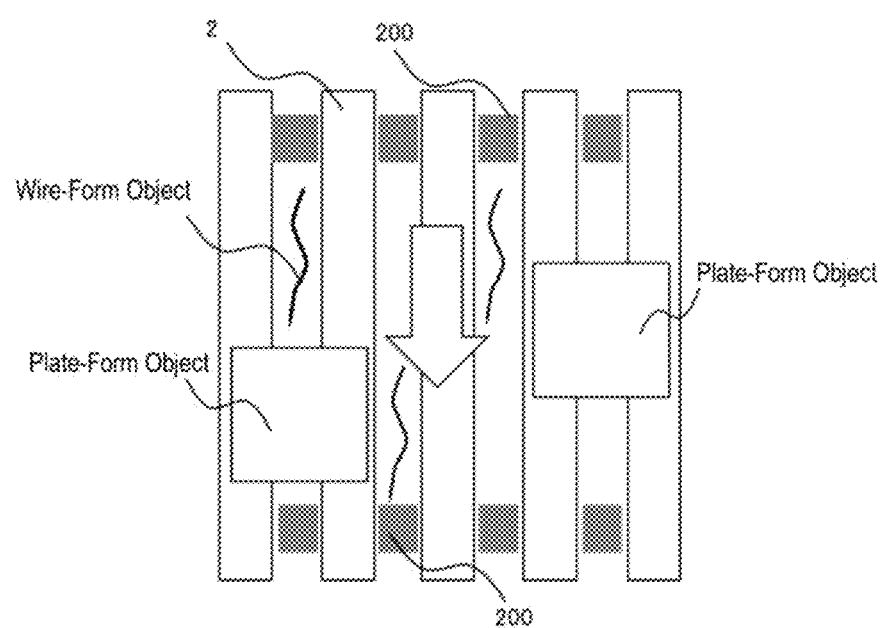
FIG. 5 is a schematic view showing an example of a device for removing wire-form objects according to an embodiment of the present invention.

As shown in FIG. 5, the use of the filters having the beam portions 200 formed at both ends of the plurality of rods 2, which support the plurality of rods 2, may result in the wire-form objects caught by the beam portions 200, so that the wire-form objects may not be sorted well under the sieve. According to the sorting device according to the embodiment of the present invention, the method for sorting wire-form objects using the same, and the method for processing electronic/electrical apparatus component scrap, as shown in FIG. 1, the filters 3 in which only one ends 2a of the plurality of rods 2 are provided with the beam portions 21, and the other ends 2b are free ends are arranged in multiple stages while overlapping with each other in the feed direction, so that the catching of the wire-form objects can be suppressed and the sorting efficiency of the wire-form objects can be further improved. Each other end 2b of each filter 3 is preferably arranged on an upper surface of a region A in which the upper surface portion 21a of the beam portion 21 is arranged, and more preferably arranged on a position closer to the upstream side in the feed direction of the region A.

While the present invention has been described with reference to the above embodiments, the present invention is not limited to each embodiment, and the components may be modified and embodied without departing from the spirit of the present invention. Further, various inventions may be created by appropriately combining the plurality of components disclosed in each embodiment. For example, some components may be removed from all the components shown in the embodiments. Further, the components of different embodiments may be optionally combined.

DESCRIPTION OF REFERENCE NUMERALS 1 vibrating sieve machine
2 rod
3 filter
4 table
5 pressing member
10 fixing portion
21 beam portion
21a upper surface portion
21b lower surface portion 21c, 21d side surface portion
21e hole
21f welded portion
22 fall prevention portion
200 beam portion

The invention claimed is:

1. A method for removing wire-form objects, the method comprising:
arranging a plurality of filters in a vibrating sieve machine such that the filters are adjacent to each other so as to partially overlap with each other in a feed direction of a raw material, each of the filters comprising a plurality of rods extending at distances in the feed direction and a beam portion for supporting the plurality of rods at one ends of the plurality of rods, the other ends of the plurality of rods being free ends;
placing a sheet-shaped pressing member comprising a sheet-shaped material, which presses the raw material placed on the filters, the sheet-shaped material having a fixed end that is fixed to the vibrating sieve machine on the feed side of the raw material and the sheet-shaped material having a free end that is not fixed to the vibrating sieve machine on the discharge side of the raw material, the sheet-shaped material configured to directly contact and press upon the wire-form objects; and
feeding a raw material containing at least wire-form objects and plate-form objects between the filters and the sheet-shaped material, and vibrating the filters to sieve out the wire-form objects toward an under-sieve side of the vibrating sieve machine.

2. The method for removing the wire-form objects according to claim 1, wherein each of the filters is arranged so as to be inclined such that a height of each of the filters on a downstream side in the feed direction of the raw material is higher than that on an upstream side in the feed direction of the raw material.

3. The method for removing the wire-form objects according to claim 2, wherein each of the filters is arranged such that an inclination angle θ of each of the filters with respect to a horizontal plane is larger than 0° and 45° or less.

4. The method for removing the wire-form objects according to claim 1,
wherein the beam portion is made of a metal hollow or solid member comprising: an upper surface portion extending in a direction intersecting with an extending direction of the plurality of rods on the plurality of rods; a lower surface portion opposing to the upper surface portion; and two side surface portions intersecting with the upper surface portion and the lower surface portion, the two side surface portions being provided with a plurality of holes, into which the plurality of rods are inserted and fixed by welding, and
wherein the method comprises arranging each of the filters such that the upper surface portion of the beam portion possessed by one filter is arranged below the free ends of the plurality of rods possessed by the other filter adjacent to the one filter on the upstream side in the feed direction of the raw material.

5. The method for removing the wire-form objects according to claim 1, wherein the method comprises using the filters in which a length of each of the rods is from 2 to 30 times a characteristic particle diameter of the wire-form objects.

6. The method for removing the wire-form objects according to claim 1, wherein the raw material is electronic/electrical apparatus component scrap, and wherein the plate-form objects contain substrate scrap, and the wire-form objects contain wire scrap.

7. A method for processing electronic/electrical apparatus component scrap, the method comprising:
arranging a plurality of filters in a vibrating sieve machine such that the filters are adjacent to each other so as to partially overlap with each other in a feed direction of a raw material, each of the filters comprising a plurality of rods extending at distances in the feed direction and a beam portion for supporting the plurality of rods at one ends of the plurality of rods, the other ends of the plurality of rods being free ends;
placing a sheet-shaped pressing member comprising a sheet-shaped material, which presses the raw material placed on the filters, the sheet-shaped material having a fixed end that is fixed to the vibrating sieve machine on the feed side of the raw material and the sheet-shaped material having a free end that is not fixed to the vibrating sieve machine on the discharge side of the raw material, the sheet-shaped material configured to directly contact and press upon the wire-form objects; and
feeding a raw material containing at least substrate scrap and wire scrap between the filters and the sheet-shaped material, and vibrating the filters to sieve out wire-form objects toward an under-sieve side of the vibrating sieve machine.

8. A device for removing wire-form objects, the device comprising:
a vibrating sieve machine;
a plurality of filters arranged in the vibrating sieve machine such that the filters are adjacent to each other so as to partially overlap with each other in a feed direction of a raw material, each of the filters comprising a plurality of rods extending at distances in the feed direction and a beam portion for supporting the plurality of rods at one ends of the plurality of rods, the other ends of the plurality of rods being free ends;
a sheet-shaped pressing member comprising a sheet-shaped material, which presses the raw material placed on the filters, the sheet-shaped material having a fixed end that is fixed to the vibrating sieve machine on the feed side of the raw material and the sheet-shaped material having a free end that is not fixed to the vibrating sieve machine on the discharge side of the raw material, the sheet-shaped material configured to directly contact and press upon the wire-form objects; and
a vibrator for vibrating the filters to sieve out wire-form objects from a raw material containing at least the wire-form objects and plate-form objects toward an under-sieve side of the vibrating sieve machine.

9. The device for removing the wire-form objects according to claim 8, wherein each of the filters is arranged so as to be inclined such that a height of each of the filters on a downstream side in the feed direction of the raw material is higher than that on an upstream side in the feed direction of the raw material.

10. The device for removing the wire-form objects according to claim 9, wherein each of the filters is arranged such that an inclination angle θ of each of the filters with respect to a horizontal plane is larger than 0° and 45° or less.

11. The device for removing the wire-form objects according to claim 8,
wherein the beam portion is made of a metal hollow or solid member comprising: an upper surface portion extending in a direction intersecting with an extending direction of the plurality of rods on the plurality of rods; a lower surface portion opposing to the upper surface portion; and two side surface portions intersecting with the upper surface portion and the lower surface portion, the two side surface portions being provided with a plurality of holes, into which the plurality of rods are inserted and fixed by welding, and wherein each of the filters is arranged such that the upper surface portion of the beam portion possessed by one filter is arranged below the free ends of the plurality of rods possessed by the other filter adjacent to the one filter on the upstream side in the feed direction of the raw material.

12. The device for removing the wire-form objects according to claim 8, wherein the raw material is electronic/electrical apparatus component scrap, and wherein the plate-form objects contain substrate scrap, and the wire-form objects contain wire scrap.

13. The method for removing wire-form objects of claim 1, further comprising:

providing a fall prevention tool on an end of an upper surface of the beam portion extending in a direction intersecting with an extending direction of the plurality of rods and extending in a substantially vertical direction from one end of the beam portion toward an upper direction to prevent the substrate scrap accidentally falling to the under-side of the sieve.

14. The method for processing electronic/electrical apparatus component scrap of claim 7, further comprising:

providing a fall prevention tool on an end of an upper surface of the beam portion extending in a direction intersecting with an extending direction of the plurality of rods and extending in a substantially vertical direction from one end of the beam portion toward an upper direction to prevent the substrate scrap accidentally falling to the under-side of the sieve.

15. The device for removing the wire-form objects of claim 8, further comprising:

a fall prevention tool provided on an end of an upper surface of the beam portion extending in a direction intersecting with an extending direction of the plurality of rods and extending in a substantially vertical direction from one end of the beam portion toward an upper direction.

16. The method for removing wire-form objects of claim 1, wherein the pressing member is configured to be suspended from the feed side toward the discharge side of the raw material and the free end of the pressing member is movable in an up-down direction while pressing the raw material on the filter on the discharge side of the raw material.

17. The method for processing electronic/electrical apparatus component scrap of claim 7, wherein the pressing member is configured to be suspended from the feed side toward the discharge side of the raw material and the free end of the pressing member is movable in an up-down direction while pressing the raw material on the filter on the discharge side of the raw material.

18. The device for removing the wire-form objects of claim 8, wherein the pressing member is configured to be suspended from the feed side toward the discharge side of the raw material and the free end of the pressing member is movable in an up-down direction while pressing the raw material on the filter on the discharge side of the raw material.

* * * * *